Oct. 20, 1942.  A. B. MUNDEL ET AL  2,299,558
WEARABLE MICROPHONE AMPLIFIER
Filed April 6, 1940  4 Sheets-Sheet 1
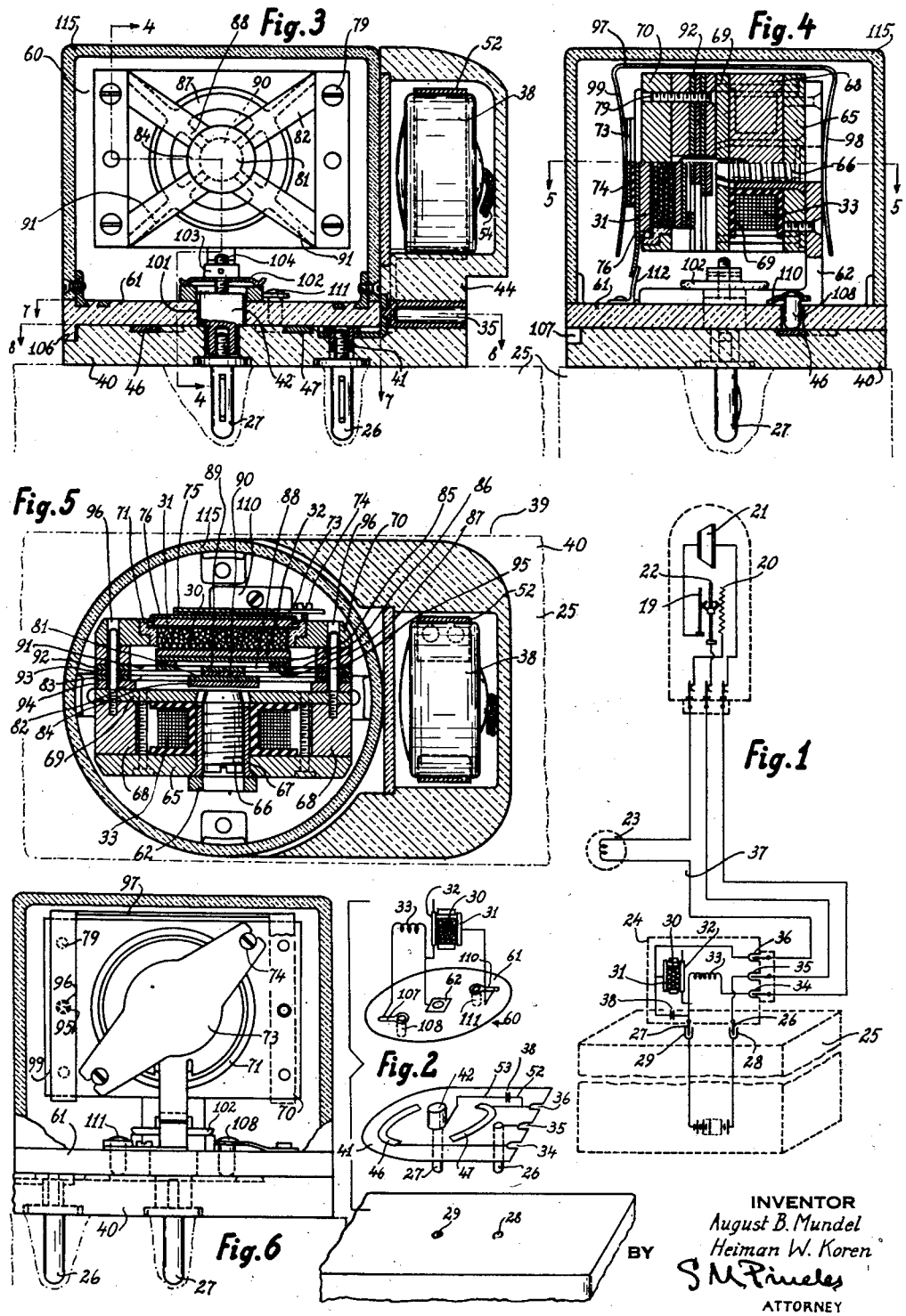
INVENTOR
August B. Mundel
Heiman W. Koren
BY
S. M. Pineles
ATTORNEY

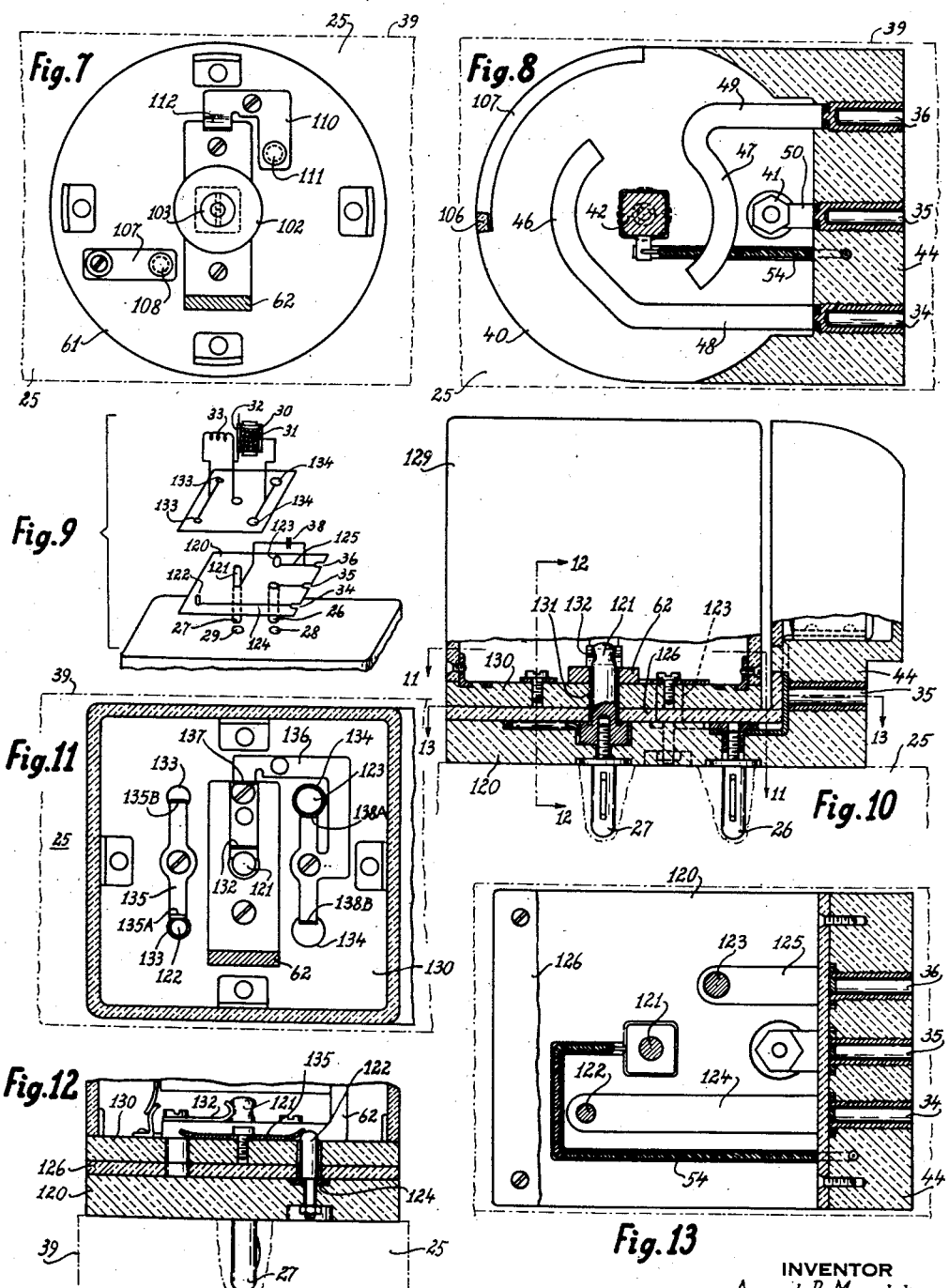

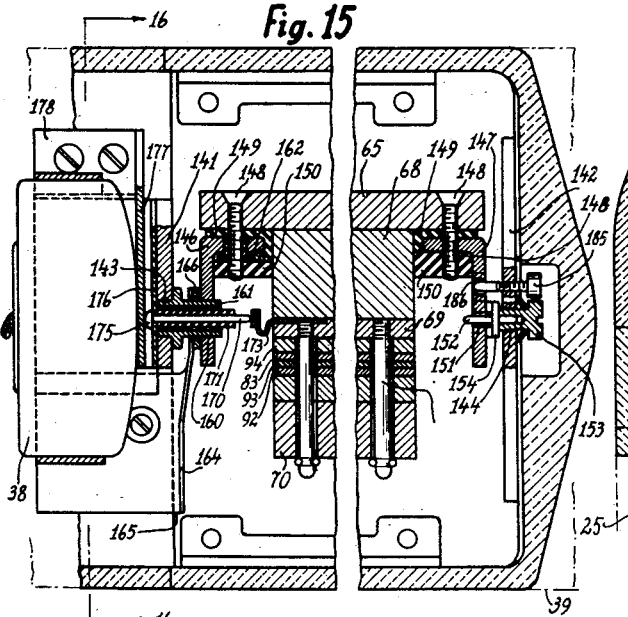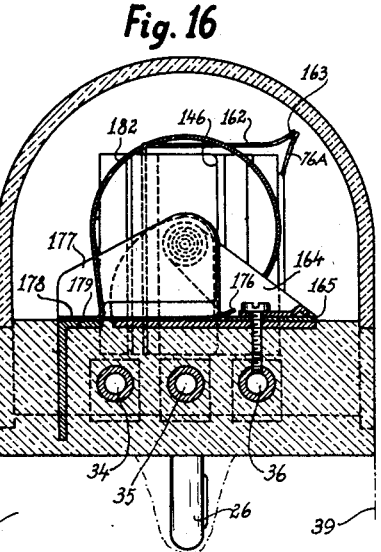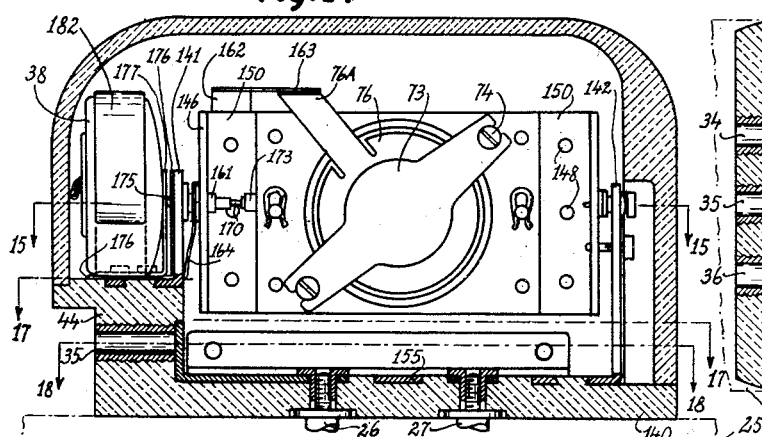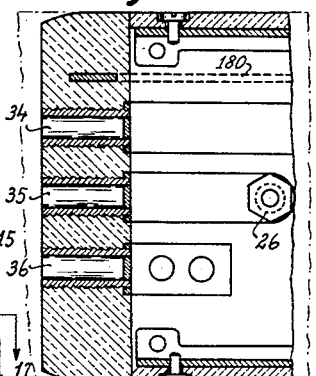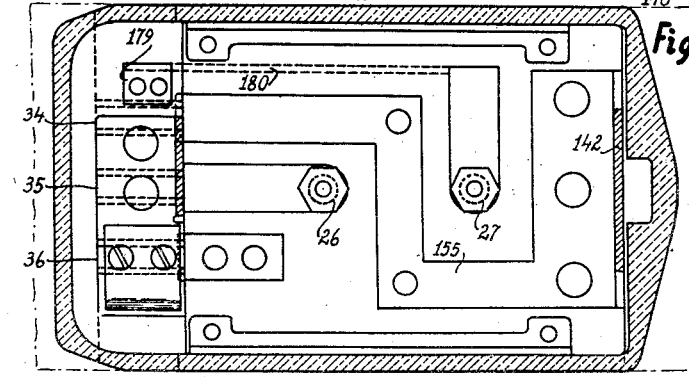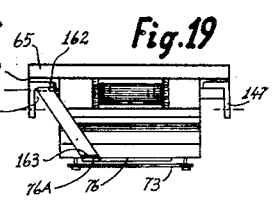

Oct. 20, 1942.    A. B. MUNDEL ET AL    2,299,558
WEARABLE MICROPHONE AMPLIFIER
Filed April 6, 1940    4 Sheets-Sheet 4

INVENTOR
August B. Mundel and Heiman W. Koren
BY S. M. Pinckley
ATTORNEY

Patented Oct. 20, 1942

2,299,558

UNITED STATES PATENT OFFICE 2,299,558

WEARABLE MICROPHONE AMPLIFIER

August B. Mundel, White Plains, and Heiman William Koren, Bronx, N. Y., assignors to Sonotone Corporation, Elmsford, N. Y., a corporation of New York Application April 6, 1940, Serial No. 328,366

7 Claims. (Cl. 179—171)

This invention relates to wearable microphone amplifiers of the type used in hearing aids designed to be worn on the body of the user.

Among the objects of the invention is a microphone amplifier of the foregoing type which is so arranged on a support by means of which it is worn on the body of the user as to maintain the amplifier in its efficient operating condition irrespective of the angular position of the body, while the aligning surface of the support facing the body is held either against a side portion of the body or a front or rear portion thereof.

The foregoing and other objects of the invention will be best understood from the following description of exemplifications thereto, reference being had to the accompanying drawings wherein Fig. 1 is a diagrammatic view of a wearable hearing aid equipped with a microphone amplifier;

Fig. 2 is a view similar to Fig. 1 illustrating diagrammatically one form of the amplifier of the invention;

Fig. 3 is a vertical sectional view of such amplifier;

Fig. 4 is a view along line 4—4 of Fig. 3;

Fig. 5 is a view along line 5—5 of Fig. 4;

Fig. 6 is a rear view of the showing in Fig. 3 with the housing broken away;

Fig. 7 is a horizontal view along line 7—7 of Fig. 3;

Fig. 8 is a horizontal view along line 8—8 of Fig. 3;

Fig. 9 is an exploded diagrammatic view of another form of a microphone hearing aid amplifier exemplifying another form of the invention;

Fig. 10 is a sectional view of parts shown in elevation of the amplifier of Fig. 1;

Fig. 11 is a view along line 11—11 of Fig. 10;

Fig. 12 is a vertical sectional view along line 12—12 of Fig. 10;

Fig. 13 is a view along line 13—13 of Fig. 10;

Fig. 14 is a view similar to Fig. 3 of another microphone amplifier exemplifying the invention;

Fig. 15 is an enlarged horizontal sectional view along line 15—15 of Fig. 14 showing parts of the amplifier;

Fig. 16 is a vertical sectional view along line 16—16 of Fig. 15;

Fig. 17 is a view along line 17—17 of Fig. 14;

Fig. 18 is a view along line 18—18 of Fig. 14;

Fig. 19 is a horizontal detailed view of a part of the mechanism of Fig. 15;

Figure 20:
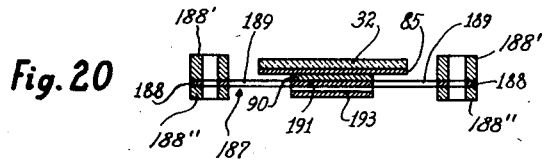
Fig. 20 is a cross-sectional view similar to Fig. 5 illustrating another form of vibratory microphone diaphragm electrode.

A typical wearable microphone amplifier hearing aid of the type generally used in the past is shown diagrammatically in Fig. 1. It comprises a transmitter casing in which is mounted a transmitter microphone 21, a control unit 22, which is shown mounted in the transmitter casing, a hearing inducing receiver, such as an air conduction receiver or a bone conduction receiver, having an actuating winding 23, and a microphone amplifier 24 usually enclosed on a casing, which is supported on the top of a battery casing 25, a multi-conductor cord 37 establishing the interconnections between the several elements of the hearing aid.

The battery casing 25 is usually of flat shape and encloses several battery cells which are connected to battery terminal sleeves 28, 29 secured in the top of the battery casing. The amplifier unit 24 is usually mounted in a fixed position on the top of the battery casing 25 by means of two battery terminal plugs 26, 27 extending from the bottom of the amplifier casing and held in slidable engagement within the terminal sleeves 28, 29 of the battery 25.

Within the amplifier casing is mounted an amplifier chamber 30 holding a loose filling of microphone carbon granules between a stationary microphone electrode 31 and a vibratory microphone electrode 32, which is vibrated by an electromagnetic vibrating unit having actuating windings 33. The vibratory microphone electrode 32 and one end of its actuating winding 33 are connected to one amplifier-battery plug 27 and the other amplifier-battery plug 26 is connected to one of the three socket terminal members 34, 35, 36 of the amplifier to which the leads of the flexible cord 37 are connected.

In the normal operating condition of the hearing aid, when the slider contact of the control unit 22 engages the associated contact strip 19 and rheostat strip 20, the microphone 21 is connected in series with the amplifier actuating winding 33 to the battery terminals 26, 27 for supplying speech frequency modulated input currents to the amplifier winding 33, and the amplifier microphone 30 is connected in series with the receiver winding 23 to the battery terminals for actuating the receiver with the amplified speech frequency output currents produced by the vibratory motion imparted to vibratory microphone electrode 32. As disclosed in U. S. Patent 2,105,296, a small electrolytic condenser 38 housed in the microphone casing and connected parallel to the amplifier microphone electrodes 31, 32 in order to make it possible to suppress disturbing impulses superimposed on the amplified current when operating at a relatively high gain.

The operation of such microphone amplifiers depends on the variation of the contact resistance between a large number of microphone carbon granules loosely held between the surfaces of the two amplifier microphone electrodes 31, 32. Accordingly, provision must be made to assure that the loosely held microphone granules shall at all times maintain contact engagement with surfaces of the amplifier microphone electrodes 31, 32. This in turn requires that the vibratory microphone electrode 32 and also the stationary microphone electrode 31 between which the amplifier microphone granules are held, shall have their surfaces aligned in a generally vertical direction while the microphone amplifier is worn by the user.

In order to assure that the amplifier microphone electrode surfaces shall remain in vertical position when the amplifier is worn by the user, it is provided with a support having an aligning surface facing a portion of the body of the user against which it is worn, the aligning surface being so arranged as to, so far as possible, automatically align the amplifier microphone electrode surfaces in a generally vertical direction. In most of the commercially sold hearing aids, the amplifier support is formed by the flat battery casing having a flat side wall serving as the aligning surface which automatically aligns the battery in a vertical position when it is held against a normally vertical body portion of the user, and the amplifier is usually mounted by the detachable plugs on the horizontal top of the battery so as to assure that as long as the aligning surface of its battery support is held in its normal vertical position against a vertical body portion, the amplifier microphone electrodes shall remain aligned in a general vertical direction.

There are, in general, two ways in which users of hearing aids wear a hearing aid battery and the microphone amplifier mounted on the top thereof. One large group of users wear the battery with its flat aligning surface bearing against a side portion of the body, such as against the side of the thigh, or against the side of the ribs, under the arm. Another group of users wear the battery with its flat aligning wall bearing against a front or rear portion of the body, as in a vest or hip pocket.

As long as the body portion against which such hearing aid amplifier support is worn remains in vertical condition, the support will maintain the amplifier microphone electrodes in vertical condition. Difficulties arise, however, if the body portion against which the amplifier support, such as the battery casing, is aligned, is tilted from a vertical to a horizontal position. Thus, if a person wearing the aligning surface of the microphone amplifier support against the side of his thigh, sits down on a chair, thereby tilting his thigh from vertical to horizontal position, the amplifier microphone electrodes aligned vertically to the aligning surface of the support will not remain in the vertical direction, but will be tilted to a substantially horizontal position, thereby rendering the amplifier microphone partially or completely inoperative.

Similarly, if a person wearing the aligning surface of the microphone amplifier support against a front or rear portion of the body tilts his body rearwardly, in leaning, for instance, back in his chair from vertical to almost horizontal position, the amplifier microphone electrodes aligned parallel to the aligning surface of the support will not remain in vertical position, but will be tilted to an angular position, thereby rendering the amplifier microphone partially or completely inoperative.

As a result, a person having a hearing aid with a microphone amplifier designed to be worn on a support held against the front or the rear of his body, is exposed to trouble when, in changing over to another garment, he places the battery casing support of the microphone amplifier in a pocket held against a side portion of his body, such as under the arm, since a slight tilt of his body upsets the operation of his hearing aid.

The invention overcomes these difficulties by arranging a hearing aid microphone amplifier on a support by means of which it is worn on the body of the user so as to make it possible to maintain its microphone electrode surface in a generally vertical position when the body portion against which it is worn is tilted from a vertical to horizontal position irrespective of whether the aligning surface of the support is held against a side portion of the body or against a front or rear portion of the body.

One form of such microphone amplifier is shown diagrammatically in Fig. 2 and structurally in Figs. 3 to 7. It comprises a base 40, of rectangular shape, for instance, so as to fit within the space on the top of a battery casing 25 having a flat side wall 39 serving as an aligning surface for aligning the battery casing and the amplifier microphone mounted thereon against the facing body portion of the user.

The amplifier is arranged to be detachably held on the flat normally horizontal top of the battery casing 25 by two downwardly projecting battery plugs 26, 27, slidably fitting into terminal socket sleeves 28, 29 secured within the top of the battery casing. In the form shown, the plug pin 26 is clamped to the base 40 by the threaded engagement of its inwardly projecting screw stud with a clamping nut 41 seated in the base plate. The plug pin 27 is clamped to the base plate 40 by the threaded engagement of its screw stud with a pivot pin 42 held clamped to the other side of the base and projecting upwardly therefrom.

The base plate 40 is made of suitable insulating material, such as a molded synthetic resin, and has an upwardly projecting terminal block 44 in which are embedded three terminal bushings 34, 35, 36 designed to receive suitable plug connectors of the cord 37, a compartment provided in the upward extension of the terminal block 44 serving to house the condenser 38 associated with the amplifier.

In the upwardly facing side of the base plate 40 are embedded, as by molding, two exposed arcuate slider contact strips 46, 47 which are connected by connector strips 48, 49 to the two terminal bushings 34, 36 of the terminal block. A similar connector strip 50 connects the bushing 35 to the clamping nut 41 of the battery terminal plug 26. The condenser 38, which is mounted in the compartment above the terminal block 44 is held in position by a clamping collar 52 which is connected through a suitable connector strip to the underlying terminal bushing 36 of the terminal block, the other terminal of the condenser 38 being connected through an insulating lead 54 to the pivot pin 42 and therethrough to the battery plug 27 in the way indicated diagrammatically in Fig. 2.

On the pivot pin 42, in sliding engagement with the underlying base plate 40, is revolvably mounted a self-contained microphone amplifier unit 60, which is so arranged as to make it possible to maintain the electrode surface of its amplifier microphone in a generally vertical position while its support, in the present case its battery 25, is tilted from its vertical position in a direction either parallel or perpendicular to its aligning surface 39 by means of which it is aligned against the body portion of the user on which it is worn.

In the form shown, the amplifier unit 60 comprises a circular mounting plate 61 fitting over the underlying surface of the base plate 40 and an angular bracket 62 is suitably secured to the mounting plate 61 so as to hold the electromagnetic vibrating structure with its actuating coil 33 and the amplifier microphone chamber 30 with its amplifier microphone electrodes 31, 32 in their operating positions. The electromagnetic system of the vibrating structure comprises a magnetic yoke bar 65 having a central pole piece 66 adjustably held within a threaded core sleeve 67 and two magnetic lugs 68 suitably clamped to the ends of the magnetic yoke 65 by a pole plate 69. A coil formed of actuating windings 33 is mounted on the pole piece. The electromagnetic system is suitably secured as by screws to the upwardly projecting arm of the mounting bracket 62, a hole in the bracket providing access to the slot provided in the outer end of the pole base 65 so as to enable adjustment of its pole piece.

A microphone chamber 30 in the form of a self-contained unit is held in its operative position in front of the pole plate. It comprises a chamber plate 70 of good heat conducting material, such as brass, having a central chamber opening within which is firmly fixed a circular microphone chamber wall 71 of suitable insulating material, such as synthetic resin. The outer side of the microphone chamber is enclosed by the stationary microphone electrode 31, of carbon, for instance, which is held in place by a spring strip 73, of spring metal, for instance, having two arms suitably clamped, as by screws 74 to the chamber plate in the way shown in Fig. 6, an insulating spacer 75 being interposed between the clamping strip 73 and a terminal contact plate 76 held against the outer side of the stationary microphone electrode 31 for providing a terminal connection thereto. The loose microphone granule filling in the space bounded by the microphone chamber wall 71 is held therein and vibrated by the vibratory microphone electrode 32, usually of carbon, which is held in a vibratory condition by a diaphragm unit 78 which is clamped to the chamber plate 70 by screws 79.

As shown in Figs. 3 to 5, the diaphragm unit 78 has a main diaphragm structure formed of a central diaphragm section 81 having four spoke-like arms 82 and clamping end strips 83 punched from a spring metal sheet, such as steel. An armature of magnetic material is united as by soldering to the central diaphragm section 81 so as to be held in front of the pole face of the pole piece 66 and the adjoining concentric face portion of the pole plate 69.

The vibratory microphone electrode 32 which is usually of carbon has its outer side stiffened by a layer 85 of brass, for instance, the rim of which is united, as by soldering, across a spacer washer 86 to a ring-shaped diaphragm section 87 of an intermediate diaphragm having four inwardly extending spoke-like spring strips 88 joining it to its central intermediate diaphragm section 89 which is united, as by soldering, across a spacer 90, to the main diaphragm section 81 to which the armature 84 is united.

To secure stable operation of the intermediate diaphragm unit formed of the outer rim section 87 and the central section 89 and the interconnecting spokes 88, its rim section 87 is provided with spoke-like strip extensions 91 terminating in two clamping end strips 92 overlying the end strips 83 of the main diaphragm and united thereto, as by soldering, across interposed spacer strips 93.

The diaphragm unit is thus formed of the main diaphragm structure 81, 82, 83 and the intermediate diaphragm structure 87, 88, 89, 91, 92, each having the same overall dimensions and each having spoke-like diagonally extending spring strip extensions through which the central diaphragm sections are connected to the end sections by means of which the diaphragms are held clamped in their vibrating positions.

The diaphragm structure so formed is clamped in its operating position in which the diaphragm electrode 32 holds the microphone granules in the vibratory position within the microphone chamber by means of two clamping blocks 94 which are secured by the screws 79 to the corners of the microphone chamber plate 70, in the way shown in Fig. 3. By making the diaphragm structures from a relatively wide strip having clamping end strips joined to an intermediate diaphragm portion by spoke-like spring strips, a short diaphragm having a length of only about three-fourths of an inch or less may be designed to operate with a very light vibratory mass at a resonant frequency which assures a good response in the principal speech frequency range. At the same time, the large width of such vibratory diaphragm structures assures their stable operation and prevents unbalancing forces from bringing their central vibratory portions from their aligned operating positions.

Although in the form shown, the central diaphragm sections 81, 87, 89 of the two diaphragm structures are circular in form and are joined to their end strips by diagonally extending spoke-like spring strips so as to have an overall rectangular shape, the principles underlying the design of such diaphragm structures will suggest many other forms of such diaphragm structures having the same structural and operating advantages.

In the practical design of the vibratory microphone electrode diaphragm unit described above, the vibratory structure formed of the spring elements 81, 82, 83 and the armature 87 carried thereby, are designed to form a vibrating system having a resonant frequency in one part of the speech frequency range between about 1500 cycles and 2000 cycles, and the vibratory structure formed of the spring sections 87, 88, 89 and the vibratory microphone electrode 32 carried thereby, are designed to form a vibrating system having a resonant frequency in another part of the frequency range around 3000 cycles, and the spoke elements 91, by means of which the spring structure 87, 88, 89 is joined to the clamping strips 93, are very flexible and are only sufficiently stiff to assure stable operation of the vibratory electrode with all of its parts vibrating in the same phase, and prevent it from undergoing undesirable modes of motion, such as tilting and rocking, as it is driven towards and away from the microphone granules in the microphone chamber.

The coupled vibratory systems so united in the vibratory microphone electrode structure make it possible to obtain a very good frequency response up to about 3500 cycles or more, as distinguished from the best prior microphones which had much poorer output frequency characteristics, and the frequency range of which was limited to less than 2500 cycles.

The frequency response of such microphone amplifier may be improved by applying damping means, such as strips of a jelly-like cellulose or vinyl-chloride resin, to the spring strips of the vibrating structure.

Such vibrating diaphragm structures make it thus possible to construct a very compact electromagnetic vibrating unit having a good overall response over a large part of the principal speech frequency range, and this in turn makes it possible to design a very compact hearing aid microphone amplifier having a good response over the principal part of the speech frequency range.

In the practical construction of such diaphragm unit, the magnetic armature and the microphone amplifier electrode are each mounted on an independent spring structure, each spring structure having the same overall dimensions. Auxiliary suspension members are formed as a part of the spring structure used to suspend the vibratory amplifier electrode. The auxiliary suspension spring support of the amplifier microphone electrode is affixed to the facing portion of the spring structure on which the armature is supported by a small spacer member. The spring structure on which the armature is suspended is made sufficiently stiff so as to serve by itself as a support which maintains the magnetic armature in its proper operating position in the magnetic field of the associated magnetic stsyem, without requiring any assistance from the elements of the spring structure which serve to support the vibratory amplifier microphone electrode. Although the spring structure of the amplifier microphone electrode support is dynamically complicated, it can be manufactured as cheaply as a standard spring diaphragm.

The self-contained amplifier microphone is held in its proper operating position with its armature 84 spaced by a small gap in front of the pole face of the pole plate 66 by providing, for instance, two aligning studs 95 threadedly held in the pole plate 69 arranged to fit into suitable aligning holes 96 extending through the end portions of the microphone chamber plate and the electrode diaphragm unit secured thereto so that by aligning the amplifier microphone by means of the aligning studs and aligning holes 95, 96, the amplifier microphone unit will be automatically brought into its proper operating position.

As shown in Fig. 4, a U-shaped clamp 97 may be provided to hold the microphone chamber clamped in its position against the electromagnetic system, the clamp having on one side a leg 98 engaging the back of the mounting bracket 62 and on the opposite side two leg arms 99 engaging the end surface portions of the diaphragm chamber. Any other clamping arrangements may be used, such as an elastic band, of rubber, for instance.

The amplifier microphone unit is arranged to be slidably movable on the base plate 40 between a position in which the flat surfaces of the microphone electrodes 31, 32 are aligned parallel to the aligning surface 39 of its support, in the present case the wall 39 of the battery casing 25, and a position perpendicular to the aligning surface 39 of its support, so as to maintain the amplifier microphone electrodes in vertical direction while the aligning surface 39 is tilted from its normal vertical position to a horizontal position.

In the form shown, the amplifier unit assembled thereon is rotatably mounted on the base plate 40 by providing the mounting plate 61 with a pivot hole 101 fitting over the pivot pin 42 projecting from the base plate 40. The pivot pin 42 extends into a hole of the bracket 62 and a spring washer 102 clamped by a nut 103 engaging a threaded stud 104 upwardly projecting from the pivot pin 42 holds clamped the mounting plate 61 in its position on the base to permit rotation of the mounting plate with the amplifier assembly secured thereto between the position in which the microphone chamber with its electrode surfaces is aligned parallel to the aligning surface 39 of the support, in the way shown in Fig. 5, and a position angularly displaced 90° therefrom in which the amplifier microphone electrode surfaces are aligned perpendicular to the aligning surface 39 of the support.

A stop lug 106 downwardly projecting from the mounting plate 61 into an arcuate groove 107 may be provided to limit the angle of rotation of the amplifier unit relatively to the base between the two 90° displaced positions of alignment of the microphone electrode surfaces to the aligning surface 39 of the support.

Provision is also made for maintaining in all positions the connections between the elements of the microphone amplifier to the circuits of the hearing aid which are completed at the plug members 26, 27 and sleeve terminals 34 to 36 of the base plate.

In the form shown, the vibratory diaphragm electrode 32 and one end of the actuating coil 33 are conductively connected to the magnetic system which in turn is conductively connected by way of its metallic supporting bracket 62 and the metallic elements of the pivotal junction between the bracket and the pivot pin 42 to the battery plug terminal 27 in the way indicated diagrammatically in Fig. 2. As shown in Fig. 7, the other end of the actuating coil 33 is connected to a contact spring strip 107, one end of which is secured, as by riveting, to the mounting plate, and the other end of which has secured thereto, as by riveting, a contact pin 108 downwardly projecting through a hole in the mounting plate to maintain sliding contact engagement with the contact strip 46 of the base plate and therethrough to terminal bushing 34 in the way indicated in Fig. 2.

As shown in Fig. 7, a similar contact spring strip 110 is suitably secured to the mounting plate and provided with a contact pin 111 downwardly projecting through a hole in the base plate to maintain contact engagement with the contact strip 47 leading to the contact bushing 46 of the base, the contact spring strip 110 being also provided with an upwardly extending spring contact projection 112 shaped to establish contact engagement with a spring contact projection of the terminal plate 76 extending along the rear of the stationary microphone electrode 31.

This arrangement assures that in all angular positions of the microphone unit to which it may be rotated on the base plate 40, one end of the actuating coil 33 will remain connected to the base terminal bushing 34 leading to the receiver transmitter microphone 21 and the stationary amplifier microphone electrode 31 will remain connected to the base bushing 36 leading to the receiver 23 while the other end of the coil and the vibratory amplifier microphone electrode 32 remain connected through plug pin 27 to the battery.

A suitable housing 115 is detachably secured to the mounting plate so as to form an enclosure around the amplifier unit mounted thereon, the housing with the mounting plate being shown as having circular form.

Another form of microphone amplifier exemplifying the invention is shown diagrammatically in Fig. 9 and structurally in Figs. 10 to 13. It comprises a base 120, provided with terminal bushings 34 to 36 and two terminal plugs 26, 27 for mounting on the top of a battery casing 25, as in the amplifier of Figs. 2 to 5. The battery plug 27 is held in its position on the base by the threaded engagement of its inwardly projecting stud with an anchoring end of an upwardly projecting plug pin 121.

Two additional upwardly projecting plug members 122, 123 are suitably secured to the base plate 120, for instance, by threaded studs held clamped within the base. The plug pin 122 is shown connected to the terminal bushing 34 of the base by a contact strip 124 and a contact strip 125 connects the plug 123 to the terminal bushing 36 of the base. In addition, an insulated lead 54 providing a connection to the insulated terminal of the condenser 38 extends through a groove in the base to the anchoring member of the plug pin 121 so as to provide a conducting connection thereto. A cover plate 126 having holes through which the plugs 121, 122, 123 project is suitably secured, as by screws, to the base to hold the contact strips in place.

A microphone amplifier unit similar to that of Figs. 2 to 5, enclosed in a housing 129 secured to a mounting plate 130, is arranged for mounting on the base plate in detachable engagement with the plug pins 121, 122, 123 in positions in which the electrode surfaces of the amplifier microphone are aligned either parallel or perpendicular to the aligning surface of its support, such as the flat wall 39 of the flat battery casing 25. In the form shown, the mounting plate 130 and the housing secured thereto are of square shape so as to fit in its different aligning positions within the space of the base plate extending in front of its terminal block 44. The mounting plate is provided with a central hole 131 fitting over the upwardly projecting base plug 121 which is long enough so as to extend through a hole in the mounting bracket 62 of the magnetic system for detachable interlocking engagement with a retaining spring 132.

The mounting plate has two additional pairs of holes 133, 134 to fit over the base plugs 122, 123, respectively, so as to make it possible to mount the amplifier unit with its mounting plate in its two different operating positions, with the microphone electrode surfaces in vertical direction aligned either in a position parallel to the aligning surface 39 of the battery support, or in a position 90° angularly displaced thereto, aligned perpendicular to the aligning surface 39 of the support.

Suitable provisions are made for automatically interconnecting the input and output terminals of the amplifier microphone unit to the circuits of the hearing aid completed by the base terminals in either one or the other mounting position of the amplifier unit on the base. In the form shown, a contact spring 135, suitably secured, as by riveting, to the mounting plate 130, has two contact spring projections 135A, 135B for making contact engagement with the base plug pin 122 in either one or the other mounting positions of the amplifier unit on the base, thereby completing through the bushing 34 the circuit between one end of the actuating winding 33 to the cord lead from the transmitter microphone 21.

Another spring contact strip 136 suitably secured to the mounting plate 130 has at one end a contact spring projection 137 arranged to establish contact engagement with the terminal projection of the terminal plate 36 of the stationary microphone electrode 31, the other end of the contact strip 136 being provided with two contact spring projections 138A, 138B for establishing detachable contact engagement with the base plug 123 in either one or the other mounting positions of the amplifier unit on the base plate 120, thereby completing through the bushing 36 of the base plate the circuit from the stationary amplifier microphone to the cord lead from the receiver winding 23.

A user having a hearing aid equipped with an amplifier of the type shown in Figs. 2 to 5 may wear the amplifier support, such as the battery casing, with its aligning wall 39 bearing either against a side portion or a rear or front portion of the body without running into the danger of being disturbed by inoperativeness of the amplifier when he tilts his body, since by merely turning the amplifier in its position on the base from one position to the other, he will assure that the amplifier electrodes with the carbon granules held therebetween will remain in vertical position while his body is tilted.

Similarly, a deafened user having a hearing aid equipped with an amplifier of the type shown in Figs. 9 to 13 may quickly change it to remain at all times operative, irrespective of the tilting of the body when worn either against a side portion of the body or against a rear or front portion thereof by merely lifting the amplifier unit from its engagement with the upwardly projecting base plugs 121, 123 turning it by 90° and plugging it back in the angularly turned position.

The base plug connections 122, 123 to the amplifier unit are suitably polarized, for instance, by making one plug 122 and the cooperating holes 33 of the mounting plate smaller than the other base plug 123 and the cooperating holes 134 of the mounting plate, so as to make it impossible to mount the amplifier unit on the base plate in an improper position.

In Figs. 14 to 19 is shown another form of a hearing aid microphone amplifier exemplifying the invention in which the amplifier unit is so revolvably mounted on its aligning support bearing against a body portion of the user as to maintain the amplifier microphone electrode surface in vertical position, irrespective of the angular position of the body portion against which it is worn.

It comprises a base plate 140 having two downwardly projecting battery plugs 26, 27 and a terminal block 44 provided with cord plug bushings 34, 35, 36, as in the other amplifier units. Two upwardly projecting gimbal brackets 141, 142, of sheet metal, for instance, have angularly bent anchoring portions suitably anchored, as by molding, within the terminal block 44 and in a portion of the base, in the way shown in Fig. 14. The gimbal brackets 141, 142 are provided with axially aligned pivot holes 143, 144 for pivotally supporting a microphone amplifier unit formed of a driving electromagnetic vibratory structure and an amplifier microphone unit, such as shown and described in connection with Figs. 2 to 6.

The pivotal mounting of the amplifier unit on the gimbal brackets 141, 142 is so designed as to permit it to swing freely on its pivot support and to be retained with amplifier microphone electrode surfaces in vertical direction irrespective of the angle to which the aligning surface 39 of the support, by means of which it is normally worn by the user, is tilted from its normally vertical position to a horizontal position.

In the form shown, the amplifier unit is provided with two angularly shaped cradle arms 146, 147 having their inwardly bent portions suitably clamped, as by screws 148, to lateral extensions of the magnet yoke 65 of the magnetic vibrating structure, the cradle arms 146, 147 being insulated from the metallic parts of the vibrating structure through insulating spacers 149, 150 by means of which they are clamped to the magnet yoke 65. The cradle arm 147 has a pivot hole 151 seated on a pivot pin 152 held in a longitudinal bore of a mounting screw 153 mounted in the suitably threaded hole 144 of the gimbal bracket 142 so as to provide a pivotal support as well as an electrical circuit connection between the cradle arm 147 and the gimbal bracket 142.

To prevent oxidation of the engaging contact surfaces and assure good contact connections, the pivot pin 152 is provided with a collar 154 faced with a layer of non-oxidizing contact material, such as platinum, and the facing portion of the cradle arm 147 is likewise provided with a similar layer of platinum. In the form shown, one end of the actuating coil 33 of the vibrating structure is connected to the cradle arm 147 which is connected through pin 152 to the gimbal bracket 142. As shown in Fig. 17, the anchoring portion of the gimbal bracket 142 is connected by a connector strip 155 embedded in the base plate 140 to the bushing 34 of the terminal block to which the lead from the transmitter microphone is connected.

The other cradle arm 146 has a pivot hole 160 which is pivotally mounted on a pivot sleeve 161 extending from the hole 143 of the other gimbal bracket 141. The pivot pin 152 and the pivot sleeve 161 serve thus as a pivot support for the two cradle arms 146, 147 of the microphone amplifier structure. The brackets 146, 147 and their pivot holes 160, 161 are so aligned and arranged parallel to the horizontal axis extending through the center of gravity of the amplifier microphone structure, while the aligning surface 39 of its support is in its normal vertical position, as to cause the amplifier microphone structure to be biased and to be held by the gravitational forces acting thereon in a position in which the amplifier microphone electrode surfaces are aligned in vertical direction as long as the aligning surface 39 of the support is tilted from a normally vertical position to an inclined position when worn against a body portion of the user.

As shown in Figs. 14, 15 and 19, a contact spring 162 has an arm clamped between the insulating clamping block 150 and the underlying clamped arm of the cradle bracket 146, and an angularly extending contact spring arm 163 arranged so as to establish and maintain contact engagement with the contact spring projection 76A of the terminal contact plate 76 overlying the stationary microphone electrode 31, in the way indicated in Figs. 16 and 19. A contact spring 164 having a bent anchoring portion 165 held clamped to a connector extending from the underlying terminal bushing 36 has at its upper end a contact portion 166 provided with a hole fitting over the pivot sleeve 161 and arranged to press against the facing surface of the cradle bracket 146 so as to establish a good sliding contact engagement therewith, all rotary sliding contact surfaces being provided with layers of non-oxidizing material, such as platinum.

By this arrangement, the metallic cradle arm 146, which is insulatingly clamped to the pivotally mounted amplifier unit, and the gimbal bracket 141, which is insulatingly mounted on the top of the terminal block 44, are utilized in conjunction with the contact springs 162 and 174 to complete the connection from the stationary microphone electrode 31 to the terminal bushing 36 of the base to which the lead from the receiver 23 is connected in the way shown in Fig. 1.

The circuit connection between the battery plug 26 to the vibratory microphone electrode 31 and the other end of the actuating coil 33, which are connected to the metallic body of the magnetic structure, is completed by elements insulatingly mounted in and adjacent to the gimbal bracket 141, in the way shown in Figs. 14 to 18. In the pivot sleeve 161 of the gimbal bracket 141 is slidably mounted a contact pin 170 which is insulated from the metallic pivot sleeve by an insulating sleeve 171. The inner end of the contact pin 170 engages a contact spring 173 which is suitably clamped to the magnetic structure of the amplifier unit, thereby completing a circuit connection from the insulated contact pin 170 to the vibratory microphone electrode 32 and the end of the actuating coil 33, which are connected to the metallic body of the magnetic structure.

The other end of the contact pin 170 is provided with a head 175 which is insulated from the adjacent outer surface of the gimbal bracket 141 by an insulating sheet 176. The head 175 of the contact pin 170 is pressed inwardly against the contact pin by one arm 177 of a contact spring, the other bent arm 178 of which is clamped to an end portion 179 of a contact strip 180 insulatingly embedded in the base plate 140, the other end of the contact strip 180 being connected to the battery plug 27 of the base plate.

The clamped portion 178 of the contact spring 177 has also an arcuately bent arm 182 embracing the casing of the electrolytic condenser 38 and establishing the circuit connection to one terminal of the condenser, the bottom of the metallic exterior of the condenser 38 being insulated from the metallic connector portions extending in the base by portions of the insulating sheet 176, arranged in the way shown in Fig. 14. The contact pin 170 insulatingly mounted in the pivot sleeve 161 of the gimbal bracket 141 provides thus in conjunction with contact springs 173, 177 engaging the opposite ends of the pin and insulated from the cradle arm 146 and the gimbal bracket 141 a circuit connection between the battery plug terminal 27 of the base and the vibratory amplifier microphone electrode 32 and the end of the actuating coil 33 connected thereto, the rotary sliding contact surfaces between the contact pin 170 and the contact spring 173 being provided with layers of non-oxidizing material, such as platinum.

The contact spring 177 exerts on the head 175 of the contact pin sufficient pressure as to maintain at the axially aligned contact spring junctions 170, 173 good contact engagement in all angular positions of the amplifier unit relatively to the base and thereby assure that the elements of the pivotally mounted microphone amplifier remain at all times connected in the hearing aid circuits which are completed through the plugs 26, 27 and the terminal bushings 34 to 36 of the base. In addition, the contact spring 177 is designed to exert pressure required to maintain the amplifier unit in its proper pivotal operating position between the two pivot supports while serving as a resilient shock absorbing support. The gimbal brackets 141, 142 are sufficiently high as to permit the amplifier to freely revolve on its pivotal support.

When an amplifier microphone of the type shown in Figs. 14 to 19 is mounted in its operating position on a support, for instance, by mounting its base 140 on the top of a flat battery casing having an aligning wall 39 bearing against the body of the user, such as the side or front portion thereof, the amplifier microphone which is pivotally mounted on such support will maintain its microphone electrode surfaces in vertical position while the body portion against which it is worn is in vertical position as well as when it is tilted to a horizontal position, irrespective of whether the aligning wall 39 of the support is held against the side or front or rear portion of the body, since each time the support is tilted, the gravitational forces swing the amplifier unit on its pivotal mountings so as to maintain the amplifier microphone electrodes in the desired vertical position.

As in the other amplifier units, the casing detachably secured to the base 140 protects the elements against tampering.

Such amplifier may be provided with means for locking the amplifier unit in a fixed position on the base so as to prevent its swinging motion relatively to the base, while it is being shipped, for instance. As shown in Fig. 15, a screw 185 threadedly mounted in a hole within the gimbal bracket 142, is arranged so that when it is screwed inwardly, the end of the screw enters a locking hole 186 in the cradle arm 147. Upon turning the screw 185 until its end is withdrawn from the locking hole 186, the amplifier unit is released from its locking engagement and is free to swing on its gimbal support.

Figure 23:
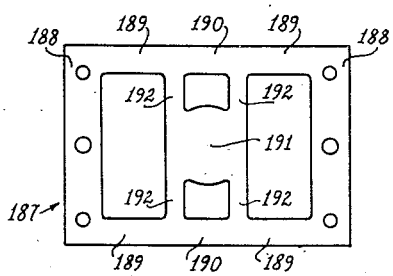
Fig. 23 is a plan view of the main diaphragm unit of the diaphragm structure of Figs. 20 and 21.

In Figs. 20 to 23 is shown another form of vibratory amplifier microphone electrode structure combining two coupled vibratory systems having different resonant frequencies in the principal part of the speech frequency range. It comprises a main substantially rectangular diaphragm unit 187, a plan view of which is shown in Fig. 23, made by punching from a flat sheet of spring material. The two shorter sides of the rectangular diaphragm structure 187 form clamping edge sections 188, the ends of which are connected by pairs of spring strips 189 to the end sections 190 of a central diaphragm section 191, the opposite sides of which are connected to its end sections 190 by two pairs of spring strips 192.

Figures 21, 22:
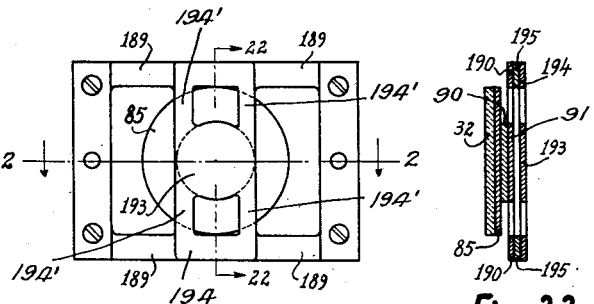
Fig. 21 is a plan view of Fig. 20.
Fig. 22 is a cross-sectional view along line 22—22 of Fig. 21.

As shown in Figs. 20 and 22, the vibratory microphone electrode 32 with its metal backing 85 is united, as by soldering, across the spacer 90 to the central diaphragm section 191 similar to the diaphragm units of Figs. 3 to 5. As shown in Fig. 22, an armature 193 connected through spring portions 194' of a cross diaphragm having its end portions 194 united, as by soldering, across spacers 195 to the border portions 190 of the central diaphragm sections so as to carry in suspension, by means of the spring strips 192, the central diaphragm section 191, and the vibratory microphone electrode 32 united thereto.

As shown in Fig. 20, the clamping edges 188 of the main diaphragm unit 187 are provided with clamping and spacer blocks 188', 188'' for clamping the entire diaphragm structure in its position on the microphone chamber plate. Since the edges of the vibratory microphone electrode 32 project beyond the edges of the central diaphragm section 191 of the diaphragm unit 187, it may be desirable to stabilize it against a tilting or rocking action as it is being vibrated.

Figure 24:
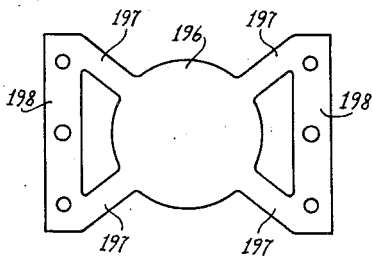
Fig. 24 is a plan view of a supporting element for the microphone electrode of such diaphragm structure.

In order to provide such stable support for the vibratory microphone electrode 32, its backing layer 85 may be made of a rectangular sheet metal element, a plan view of which is shown in Fig. 24, having a central portion 196 connected by flexible spoke-like spring strips 197 to clamping end strips 198 which are united to the clamping edges 188 of the main diaphragm 187, as in the diaphragm structure of Figs. 3 to 5.

Instead of securing the magnetic armature to the end portions 190 of the central diaphragm section 191 and the vibratory microphone electrode to its central diaphragm section 191, the armature may be secured to the central diaphragm section 191 and the vibratory microphone electrode 32 may be secured to the end portions 190 of the central diaphragm section 191. By proper proportioning of the spring elements and the distribution of the masses in such diaphragm structure, operating results similar to those obtained with the other microphone electrode diaphragm structures may be secured.

Other modifications of the invention will suggest themselves to those skilled in the art. It is accordingly desired that the appended claims be construed broadly and that they shall not be limited to the specific details shown and described in connection with exemplifications thereof.

It is claimed:

1. In a microphone amplifier arrangement actuated by input currents of the speech frequency range for producing amplified output currents supplied to an output circuit of a hearing aid device worn on the body of the user, an amplifier microphone unit comprising a microphone chamber confining a hollow space, a vibratory microphone electrode of one polarity having a vibratory electrode surface bordering one side of said chamber space, a microphone electrode of opposite polarity having an electrode surface facing another side of said chamber space, and a quantity of microphone granules loosely placed in said chamber so as to produce variations of the current in said output circuit in response to the vibratory motion imparted to said granules by said vibratory electrode if its electrode surface is maintained in a generally vertical direction, vibratory driving means actuated by currents in said input circuit for imparting a vibratory motion to said vibratory electrode, a support for said microphone amplifier unit designed to be worn by the user having an aligning surface bearing against the user's body, a holding member for holding said amplifier unit on said support so as to maintain said vibratory electrode surface in a generally vertical direction when said aligning surface is maintained in a general vertical direction, said holding member including junction means designed and arranged to provide for holding said amplifier unit in different angular positions relatively to said aligning surface so as to maintain said vibratory electrode surface in a generally vertical direction while said support is tilted from its vertical position to horizontal position.

2. In a microphone amplifier arrangement actuated by input currents of the speech frequency range for producing amplified output currents supplied to an output circuit of a hearing aid device worn on the body of the user, an amplifier microphone unit comprising a microphone chamber confining a hollow space, a vibratory microphone electrode of one polarity having a vibratory electrode surface bordering one side of said chamber space, a microphone electrode of opposite polarity having an electrode surface facing another side of said chamber space, and a quantity of microphone granules loosely placed in said chamber so as to produce variations of the current in said output circuit in response to the vibratory motion imparted to said granules by said vibratory electrode if its electrode surface is maintained in a generally vertical direction, vibratory driving means actuated by currents in said input circuit for imparting a vibratory motion to said vibratory electrode, a support for said microphone amplifier unit designed to be worn by the user having an aligning surface bearing against the user's body, a holding member for holding said amplifier unit on said support so as to maintain said vibratory electrode surface in a generally vertical direction when said aligning surface is maintained in a general vertical direction, said holding member including junction means designed and arranged to provide for holding said amplifier unit in different angular positions relatively to said aligning surface so as to maintain said vibratory electrode surface in a generally vertical direction while said support is tilted in a plane either parallel or perpendicular to its aligning surface.

3. In a microphone amplifier arrangement actuated by input currents of the speech frequency range for producing amplified output currents supplied to an output circuit of a hearing aid device worn on the body of the user, an amplifier microphone unit comprising a microphone chamber confining a hollow space, a vibratory microphone electrode of one polarity having a vibratory electrode surface bordering one side of said chamber space, a microphone electrode of opposite polarity having an electrode surface facing another side of said chamber space, and a quantity of microphone granules loosely placed in said chamber so as to produce variations of the current in said output circuit in response to the vibratory motion imparted to said granules by said vibratory electrode if its electrode surface is maintained in a generally vertical direction, vibratory driving means actuated by currents in said input circuit for imparting a vibratory motion to said vibratory electrode, a support for said microphone amplifier unit designed to be worn by the user having an aligning surface bearing against the user's body, a holding member for holding said amplifier unit on said support so as to maintain said vibratory electrode surface in a generally vertical direction when said aligning surface is maintained in a general vertical direction, said holding member including junction means designed and arranged to provide for holding said amplifier unit in different angular positions relatively to said aligning surface so as to maintain said vibratory electrode surface in a generally vertical direction while said support is tilted from its vertical position to horizontal position, said junction means including circuit elements constituting parts of said input and said output circuits.

4. In a microphone amplifier arrangement actuated by input currents of the speech frequency range for producing amplified output currents supplied to an output circuit of a hearing aid device worn on the body of the user, an amplifier microphone unit comprising a microphone chamber confining a hollow space, a vibratory microphone electrode of one polarity having a vibratory electrode surface bordering one side of said chamber space, a microphone electrode of opposite polarity having an electrode surface facing another side of said chamber space, and a quantity of microphone granules loosely placed in said chamber so as to produce variations of the current in said output circuit in response to the vibratory motion imparted to said granules by said vibratory electrode if its electrode surface is maintained in a generally vertical direction, vibratory driving means actuated by currents in said input circuit for imparting a vibratory motion to said vibratory electrode, a support for said microphone amplifier unit designed to be worn by the user having an aligning surface bearing against the user's body, a holding member for holding said amplifier unit on said support so as to maintain said vibratory electrode surface in a generally vertical direction when said aligning surface is maintained in a general vertical direction, said holding member including junction means designed and arranged to provide for holding said amplifier unit in different angular positions relatively to said aligning surface so as to maintain said vibratory electrode surface in a generally vertical direction while said support is tilted in a plane either parallel or perpendicular to its aligning surface, said junction means including circuit elements constituting parts of said input and said output circuits.

5. In a microphone amplifier arrangement actuated by input currents of the speech frequency range for producing amplified output currents supplied to an output circuit of a hearing aid device worn on the body of the user, an amplifier microphone comprising a vibratory electrode having an inwardly facing vibratory microphone electrode of one polarity, a microphone electrode of opposite polarity, and a quantity of microphone granules held between said electrodes so as to produce variations of the current in said output circuit in response to the vibratory motion imparted to said granules by said vibratory electrode; a support including vibratory driving means actuated by said input currents for inducing corresponding vibratory forces; a vibratory spring diaphragm structure having two opposite end portions clamped to said support; said diaphragm structure including an intermediate mass element, two spring elements connecting said intermediate mass element to the two end portions of said diaphragm structure and an inner mass element having two spring elements connecting it to said intermediate mass element;

said vibratory electrode forming part of one of said two mass elements; the other of said mass elements being arranged so as to be driven by said vibratory force and impart vibratory forces to said vibratory electrode; the masses and spring element of said diaphragm structure being so designed and proportioned as to form a coupled vibratory system having one resonance frequency in one part of the speech frequency range and another resonant frequency in another part of the speech frequency range.

6. In a microphone amplifier arrangement actuated by input currents of the speech frequency range for producing amplified output currents supplied to an output circuit of a hearing aid device worn on the body of the user, an amplifier microphone comprising a vibratory electrode having an inwardly facing vibratory microphone electrode of one polarity, a microphone electrode of opposite polarity, and a quantity of microphone granules held between said electrodes so as to produce variations of the current in said output circuit in response to the vibratory motion imparted to said granules by said vibratory electrode; a support including vibratory driving means actuated by said input currents for inducing corresponding vibratory forces; a vibratory spring diaphragm structure having two opposite end portions clamped to said support; said diaphragm structure including an intermediate mass element, two spring elements connecting said intermediate mass element to the two end portions of said diaphragm structure and an inner mass element having two spring elements connecting it to said intermediate mass element; said vibratory electrode forming part of one of said two mass elements; the other of said mass elements being arranged so as to be driven by said vibratory force and impart vibratory forces to said vibratory electrode; the masses and spring element of said diaphragm structure being so designed and proportioned as to form a coupled vibratory system having one resonance frequency in one part of the speech frequency range and another resonant frequency in another part of the speech frequency range; said intermediate mass element forming part of a diaphragm unit having portions constituting parts of the end portions of said diaphragm structure.

7. In a microphone amplifier arrangement actuated by input currents of the speech frequency range for producing amplified output currents supplied to an output circuit of a hearing aid device worn on the body of the user, an amplifier microphone comprising a vibratory electrode having an inwardly facing vibratory microphone electrode of one polarity, a microphone electrode of opposite polarity, and a quantity of microphone granules held between said electrodes so as to produce variations of the current in said output circuit in response to the vibratory motion imparted to said granules by said vibratory electrode; a support including vibratory driving means actuated by said input currents for inducing corresponding vibratory forces; a vibratory spring diaphragm structure having two opposite end portions clamped to said support; said diaphragm structure including an intermediate mass element, two spring elements connecting said intermediate mass element to the end portions of said diaphragm structure and an inner mass element having two spring elements connecting it to said intermediate mass element; said vibratory electrode forming part of one of said two mass elements; the other of said mass elements being arranged so as to be driven by said vibratory force and impart vibratory forces to said vibratory electrode; the masses and spring element of said diaphragm structure being so designed and proportioned as to form a coupled vibratory system having one resonance frequency in one part of the speech frequency range and another resonant frequency in another part of the speech frequency range; said intermediate mass element and said inner mass element forming parts of two superposed diaphragm units having portions constituting parts of the end portions of said diaphragm structure.

AUGUST B. MUNDEL.
HEIMAN WILLIAM KOREN.